United States Patent
Bacon et al.

(10) Patent No.: US 7,345,433 B2
(45) Date of Patent: Mar. 18, 2008

(54) REVERSIBLE POLARITY LED LAMP MODULE USING CURRENT REGULATOR AND METHOD THEREFOR

(76) Inventors: Christopher C. Bacon, 3411 E. Vallejo Ct., Gilbert, AZ (US) 85297; Tracy A. Bacon, 3411 E. Vallejo Ct., Gilbert, AZ (US) 85297

( * ) Notice: Subject to any disclaimer, the term of this patent is extended or adjusted under 35 U.S.C. 154(b) by 215 days.

(21) Appl. No.: 11/030,221

(22) Filed: Jan. 5, 2005

(65) Prior Publication Data

US 2006/0145636 A1 Jul. 6, 2006

(51) Int. Cl.
*G05F 1/00* (2006.01)

(52) U.S. Cl. .......................... 315/291; 345/76; 345/82

(58) Field of Classification Search .......... 315/169.1, 315/169.3, 291, 309, 128, 247, 209 R, 224, 315/225, 307, 308; 345/212, 82, 211, 76, 345/79, 84; 362/119
See application file for complete search history.

(56) References Cited

U.S. PATENT DOCUMENTS

| | | | | |
|---|---|---|---|---|
| 5,959,413 | A * | 9/1999 | Komarek et al. | 315/306 |
| 5,982,105 | A * | 11/1999 | Masters | 315/169.3 |
| 6,371,636 | B1 | 4/2002 | Wesson | 315/169.3 |
| 6,392,355 | B1 * | 5/2002 | Palmer et al. | 315/169.1 |
| 6,426,593 | B1 * | 7/2002 | Nieberger et al. | 315/131 |
| 6,538,626 | B1 * | 3/2003 | Nieberger et al. | 345/46 |
| 6,786,625 | B2 | 9/2004 | Wesson | 315/169.3 |
| 6,864,867 | B2 * | 3/2005 | Biebl | 345/82 |
| 7,239,087 | B2 * | 7/2007 | Ball | 315/128 |

OTHER PUBLICATIONS

High Currency LED Driver, Semiconductor Components Industries Publication Order No. NUD4001/D, Oct. 2004—Rev. 4, 8 pages.
NUD4001 and NUD4011 Low Cost Integrated Current Sources for LEDS Lighting Applications . . . , Semiconductor Components Industries, LLC, Publication Order No. AND8156/D, Jul. 2004—Rev., 12 pages.

* cited by examiner

*Primary Examiner*—Douglas W. Owens
*Assistant Examiner*—Jimmy Vu
(74) *Attorney, Agent, or Firm*—Robert D. Atkins; Quarles & Brady LLP

(57) ABSTRACT

A lamp module has a base with first and second electrical contacts for inserting into a socket in alternate orientations. A printed circuit board is mounted to the base and has a reverse polarity circuit coupled to the first and second electrical contacts for converting a DC potential across the first and second electrical contacts to a power supply voltage. A current regulator has a first terminal receiving the DC power supply voltage from the reverse polarity circuit. A programming circuit provides a programming current to a second terminal of the current regulator to generate an output current in response to the programming current. An LED matrix is mounted to the base and has an input coupled for receiving the output current of the current regulator. The LED matrix has interconnected LEDs which emit a light intensity in response to the output current of the current regulator.

23 Claims, 8 Drawing Sheets

REVERSIBLE POLARITY LED LAMP MODULE USING CURRENT REGULATOR AND METHOD THEREFOR

FIELD OF THE INVENTION

The present invention relates in general to lamp modules and, more particularly, to a reversible polarity light emitting diode (LED) lamp module using a current regulator.

BACKGROUND OF THE INVENTION

LED lamp modules are used in many applications. Motor vehicles use a number of lamps and light bulbs to signal driver intention, warnings, and other status of the vehicle. The light bulbs may be located inside or external to the vehicle, and are typically inserted into sockets which are electrically coupled to the vehicle power supply in a controlled manner. For example, the light bulb may be used as an external front, side, or rear turn signal indicator. The light bulb can also be used for headlights, tail lights, back-up lights, brake lights, emergency flashers, and the like. Most, if not all, state and local ordinances require external lights on motor vehicles for visibility and safety. In other cases, light bulbs are used to illuminate the instrument panel, interior compartment, open door, footing area outside vehicle, vanity mirror, cargo area, and trunk.

Lighting for various end products has long been embodied as incandescent light bulbs. The light bulbs operate using various power supply sources, some producing DC voltage as found in most vehicles, and others operate from an AC voltage such as the light bulbs typically found in houses and buildings. Most vehicles operate from a 12 volt DC power supply to the vehicle. As a tail light, when the tail light switch is turned to the ON position, the vehicle's 12 volt DC power supply is applied to the tail light bulb to illuminate the filament. The tail light bulb emits an intensity of light. In the case of a brake light, when the driver depresses the brake pedal, the 12 volt DC power supply is applied to the brake light bulb to illuminate the filament. The brake light bulb emits an intensity of light, greater than the intensity of the tail light. The incandescent light bulb is known to consume significant power, burn hot, and have a relatively short lifespan.

More recently, LEDs lamp modules have been used in lieu of the incandescent light bulbs. Examples of the LED lamp modules are found in U.S. Pat. Nos. 6,371,636 and 6,786,625. The LEDs typically operate at voltages between 1.7 and 2.2 volts, and must be able to produce a light intensity suitable for human perception and recognition from a distance. Since light bulbs are typically operated at higher voltages, the current and voltage must be controlled in order to prevent damage to the LEDs. When used in light bulbs, the LEDs are usually arranged in a matrix or array in the lamp module. Generally, all LEDs in the matrix emit light at the same time. The LEDs emit an intensity of light as a function of the current supplied to the LED matrix.

In the prior art LED lamp modules used in dual intensity applications such as brake lights, turn signals and other dual intensity light bulb applications, when the operator turns on the tail lights, pulls the turn signal lever, depresses the brake pedal, or otherwise activates the light circuit, a DC voltage is applied through a power resistor to the LED matrix. The power resistor converts the DC voltage to an appropriate current for driving the LED matrix. The value of the power resistor determines the magnitude of the current flow to the LED matrix and accordingly, the intensity of illumination of the LEDs. The dim circuit signal path will have a first value of resistance between the DC power supply and the LED matrix. The bright circuit signal path will have a second value of resistance between the DC power supply and the LED matrix. The first value of resistance sets a first current level and illuminates the LED matrix with a first intensity corresponding to a dimmer light. The second value of resistance sets a second current level and illuminates the LED matrix with a second intensity corresponding to a brighter light, e.g., a brake light or turn signal light in a vehicle.

The LED lamp module may also have an electronic switching circuit to connect and disconnect the resistor supplied current to the LED matrix. The switching circuit switches on and off at predetermined frequency to permit the LED matrix to flash, for a turn signal function or emergency flasher function.

The LED voltage drop is a function of the temperature of the LED. When power resistors are used for current control, they cannot adapt to changing temperatures. As a result, the LEDs do not always receive an optimal flow of current. The LEDs may be over-driven which will shorten their life, or under-driven which causes them to appear dim. The power resistors also reduce the life span of the LED and may not allow the LED light module to operate at peak performance over the range of temperatures.

Another problem associated with using power resistors in LED matrix lamp modules is that they are unable to adapt to a variation in DC supply voltage. Although sources of power to buildings and vehicle voltages are set to operate at nominal voltages, the actual voltage may vary considerably. The LEDs are more vulnerable to these variations, since they are not designed to function at the higher voltage. The use of power resistors to control LED light intensity is problematic. If the LED lamp module is set up with a power resistor that will protect the LED at a higher voltage, 14 volts, then the LED will appear dimmer than desired if the supply voltage drops, to 12 volts. If the same LED lamp module is set up with power resistors to operate at full brightness at lower voltage, 12 volts, then the LEDs will burn out prematurely if the system voltage is slightly higher, 14 volts. The use of power resistors in LED lamp modules often results in the premature burn out of the LEDs and/or LED light modules that are unable to operate at optimal peak intensities.

LEDs and multi-LED light bulbs are manufactured in such a manner as to require a particular polarity when used in DC circuits such as an automobile lighting and other DC applications, whereas conventional incandescent light bulbs will function regardless of plus or minus (+/−) polarity in the DC circuit. As a result, many of the conventional sockets commonly used do not key the bulb to ensure that proper polarity is assigned when the bulb is inserted. While this is not a problem with the ambipolar incandescent bulbs, it is a problem with existing LED light bulbs causing the bulb to not function if the polarity happens to be reversed.

A need exists for an LED lamp module which provides substantially consistent brightness over variation in the supply voltage, and temperatures. A need also exists to eliminate the ambiguity of polarity in DC sockets so that LED lamp modules will operate in the DC circuit regardless of the polarity of the wiring connected to the socket, and regardless which way the bulb is inserted into the socket. The LED lamp module design needs to provide for mistake proof installation.

SUMMARY OF THE INVENTION

In one embodiment, the present invention is a light emitting diode (LED) lamp module comprising a reverse polarity circuit having inputs coupled to first and second electrical contacts for receiving a DC voltage and an output providing a DC power supply voltage. An electronic current regulator has a power supply terminal coupled to an output of the reverse polarity circuit. An LED matrix has an input coupled to an output of the electronic current regulator. A programming circuit provides a programming signal to a programming input of the electronic current regulator to generate an output current to the LED matrix. The programming circuit includes a first diode and resistor serially coupled between the first electrical contact and the programming input of the electronic current regulator.

In another embodiment, the present invention is a lamp module comprising a base having first and second electrical contacts adapted for inserting into a socket in alternate orientations. A printed circuit board is mounted to the base. The printed circuit board includes a reverse polarity circuit coupled to the first and second electrical contacts for converting a DC potential across the first and second electrical contacts to a DC power supply voltage, a current regulator having a first terminal coupled for receiving the DC power supply voltage from the reverse polarity circuit, and a programming circuit providing a programming signal to a second terminal of the current regulator to generate an output current. An LED matrix is mounted to the base and has an input coupled for receiving the output current of the current regulator.

In another embodiment, the present invention is an LED lamp module having first and second electrical contacts. A current regulator has a first terminal coupled for receiving a DC power supply voltage a current regulator having a first terminal coupled for receiving a DC power supply voltage. A programming circuit provides a programming signal to a second terminal of the current regulator to generate an output current. An LED matrix has an input coupled for receiving the output current of the current regulator.

In another embodiment, the present invention is a method making a light emitting diode (LED) lamp module comprising providing a base having first and second electrical contacts adapted for inserting into a socket in alternate orientations, providing a printed circuit board mounted to the base, the printed circuit board being capable of converting a DC potential across the first and second electrical contacts to a DC power supply voltage, generating a programming signal, supplying the DC power supply voltage to a current regulator, and generating an output current from the current regulator in response to the programming signal, and providing an LED matrix mounted to the base which emits a light in response to the output current of the current regulator.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
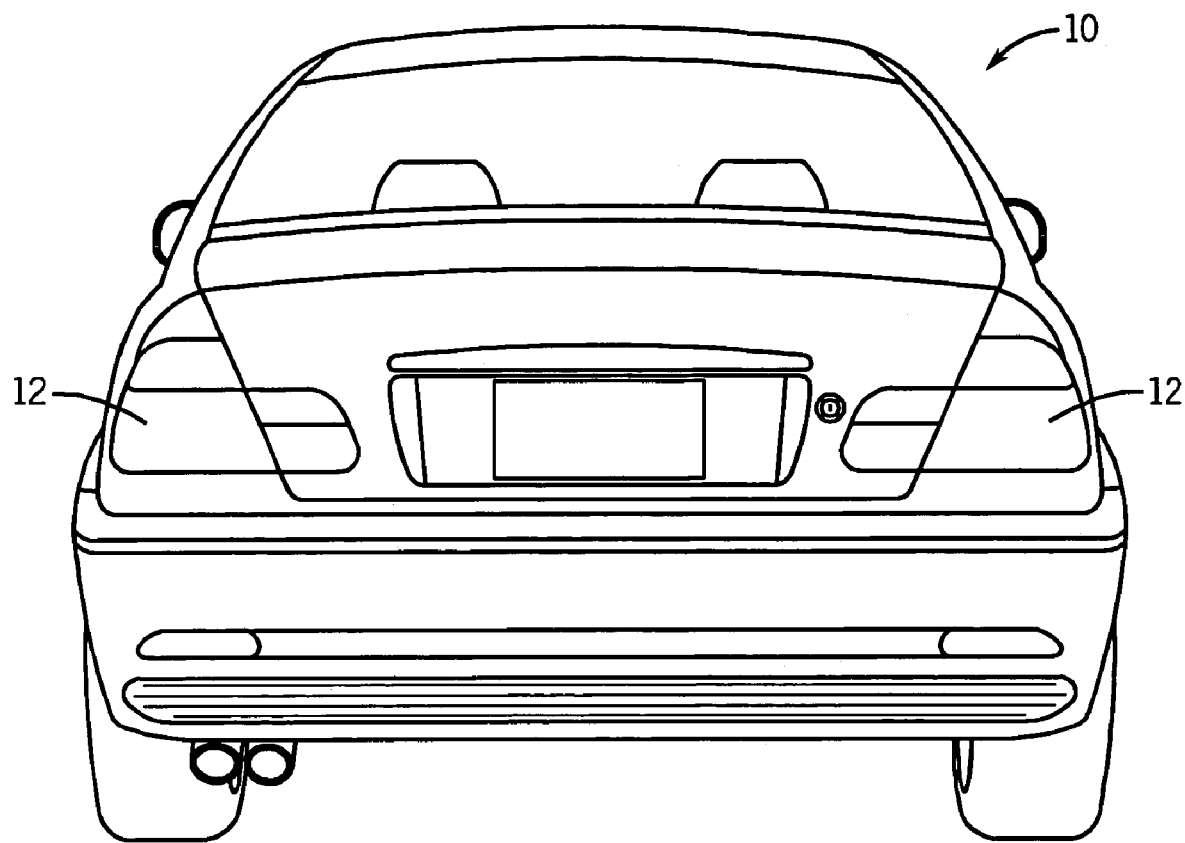
FIG. 1 illustrates an automobile containing an LED lamp module.

Referring to FIG. 1, a rear portion of motor vehicle 10 is shown with tail light assemblies 12. Each tail light assembly 12 contains a light emitting diode (LED) lamp module. The LED lamp module is controlled by the operator of motor vehicle 10 to emit a beam having a first intensity for a tail light function and/or a second intensity for a brake light function. The LED lamp module can be set to blink on and off for turn signal and emergency flasher functions. By turning on the tail light switch, the operator causes the tail light to illuminate with the first intensity. By depressing on the brake pedal, the operator causes the brake light to illuminate with the second intensity, which is greater than the first intensity. By turning on the turn signal indicator, the operator causes the lamp module to flash on and off at a predetermined frequency. A similar LED lamp module can be used for interior lighting, instrument lighting, exterior decorative lighting, warning lights, street lighting, household lighting, etc.

The LED lamp module is also applicable to marine, aviation, motorcycles, recreational vehicles, trailers, bicycles, off-road vehicles, electric power chairs, public transportation, general transportation needs, street lighting, landscape lighting, household and building lighting.

Figure 2A:
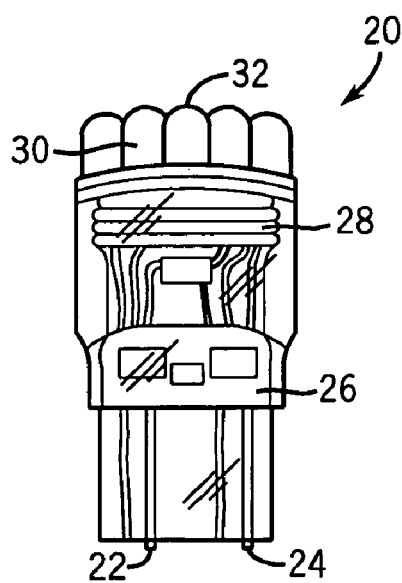
FIGS. 2a-2g illustrate a variety of form factors for the LED lamp module.

Turning to FIG. 2a, LED lamp module 20 is shown having electrical contacts 22 and 24, base structure 26, printed circuit board 28, LED matrix 30, and protective cover 32. In one embodiment, LED matrix 30 has 8 individual LEDs. The number of LEDs, the direction and orientation of the LEDS in LED matrix 30 is a design choice and can vary depending on the end application. LED lamp module 20 is inserted into a mating socket in vehicle 10 to supply power to electrical contacts 22 and 24.

Figure 2B:
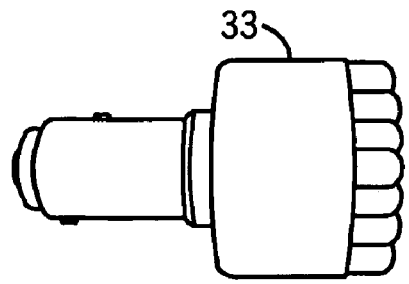
Figure 2C:
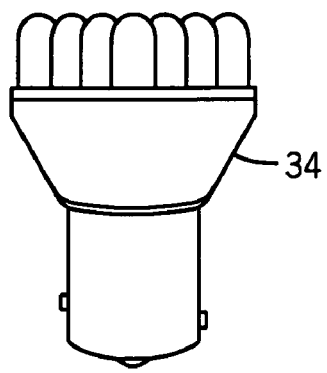
Figure 2D:
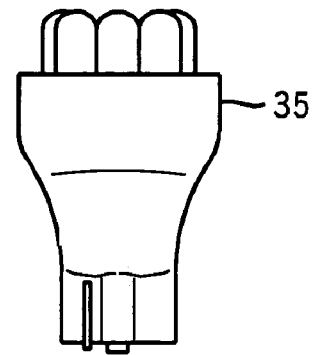
Figure 2E:
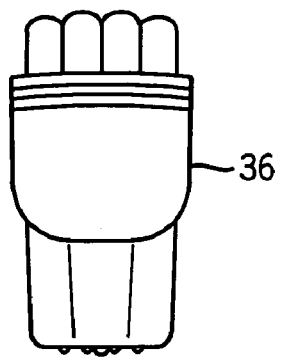
Figure 2F:
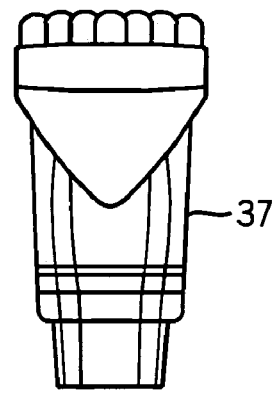
Figure 2G:
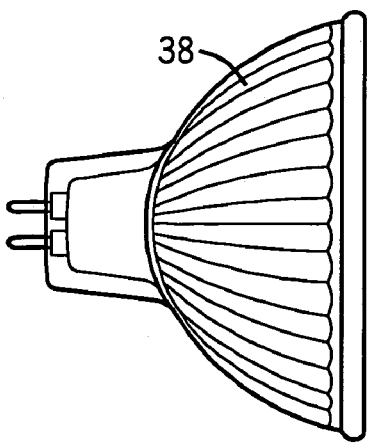

Another LED lamp module 33 is shown in FIG. 2b, which is designed to insert into a corresponding mating socket on motor vehicle 10. FIGS. 2c-2g illustrates other LED lamp modules 34, 35, 36, 37, and 38 designed for various applications. Each LED lamp module may include electrical contact(s), base structure, printed circuit board, LED matrix, and protective cover similar to that described in FIG. 2a.

Figure 3:
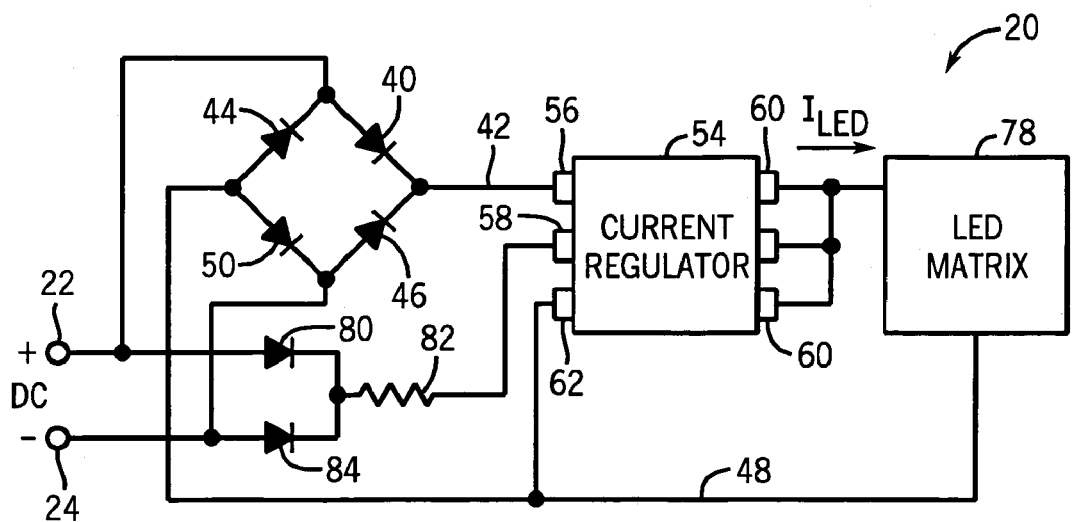
FIG. 3 is a block diagram of the LED lamp module having a single programming intensity of the LED matrix.

An electrical block diagram of LED module 20 is shown in FIG. 3. The electrical block diagram functions as a single illumination device with two electrical contacts. The electrical block diagram includes a reverse polarity circuit, programming circuit, and electronic current regulator mounted to printed circuit board 28. A DC voltage is applied between electrical contacts 22 and 24. The DC voltage may have first or second polarities depending on the physical orientation of the LED lamp module in the socket. The reverse polarity circuit senses the polarity of the DC voltage and provides a positive DC voltage to the electronic current regulator. The reverse polarity circuit includes diode 40 having an anode coupled to electrical contact 22 and a cathode coupled to conductor 42. Diode 44 has a cathode coupled to electrical contact 22 and an anode coupled to ground conductor 48. Diode 46 has an anode coupled to electrical contact 24 and a cathode coupled to conductor 42. Diode 50 has a cathode coupled to electrical contact 24 and an anode coupled to ground conductor 48. Diodes 40, 44, 46, and 50 are semiconductor devices having P/N junctions which allows current to flow in one direction (anode to cathode) and blocks current flow in the other direction (cathode to anode) when reverse biased.

Figure 4:
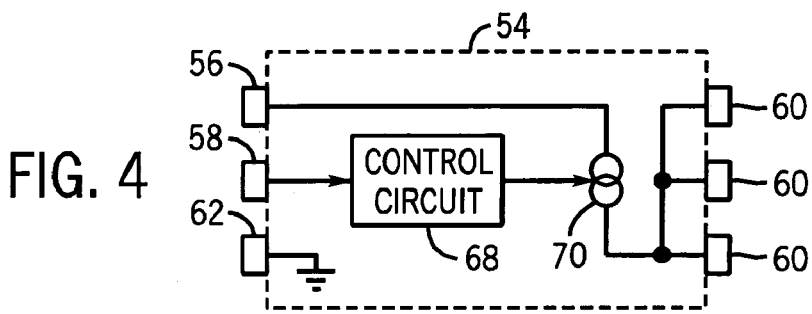
FIG. 4 illustrates further detail of the current regulator of the LED lamp module.

Current regulator 54 is an integrated circuit (IC) having a plurality of electrical pins or terminals. Further detail of electronic current regulator 54 is shown in FIG. 4. Pin 56 is the DC power supply to the IC. Pin 58 is the current programming terminal for the IC. Pin(s) 60 is the current source output terminal of current regulator 54. Pin 62 of current regulator 54 is connected to ground conductor 48. Current regulator 54 receives a programming signal (voltage or current) on pin 58. In the present embodiment, the programming signal is shown as a current level. The programming current sets a current output level in control circuit 68, which in turn controls current source 70 to source a current to pin(s) 60. The output current $I_{LED}$ of current regulator 54 is supplied to an input of LED matrix 78. An output of LED matrix 78 is coupled to ground conductor 48. The magnitude of the current $I_{LED}$ of current regulator 54 sets the light intensity level of LED matrix 78. In one embodiment, current regulator IC 54 may be part number NUD4001 manufactured by ON Semiconductor LLC.

Returning to FIG. 3, the power supply voltage on conductor 42 is applied to pin 56. Pin(s) 60 of current regulator 54 are coupled to an input of LED matrix 78. Diode 80 has an anode coupled to conductor 22 and a cathode coupled to a first terminal of resistor 82. Diode 84 has an anode coupled to conductor 24 and a cathode coupled to the interconnection of diode 80 and resistor 82. The second terminal of resistor 82 is coupled in common to pin 58 of current regulator 54. Accordingly, diode 80 and resistor 82 are serially coupled between conductor 22 and pin 58 of current regulator 54.

The operation of LED lamp module 20 proceeds as follows: LED lamp module 20 has electrical contacts 22 and 24 receiving a DC voltage. The electrical contacts are reversible allowing LED lamp module 20 to be inserted into the socket on motor vehicle 10 in either electrical orientation. In one orientation, when LED lamp module 20 is inserted in its socket, electrical contact 22 connects to a controlled 12 volt DC power supply and electrical contact 24 connects to the vehicle ground terminal. When the operator turns on the tail light switch or depresses the brake pedal, the 12 volt DC power supply to electrical contact 22 is energized. The potential on electrical contact 22 is positive with respect to the potential on conductor 42. Diode 40 is forward biased and diode 44 is reversed biased. The potential on conductor 48 is positive with respect to the potential on electrical contact 24. Diode 50 is forward biased and diode 46 is reversed biased. The conduction path through diodes 40 and 50 is enabled or conducting while the conduction path through diodes 44 and 46 is disabled or blocked. The 12 volt DC power supply is routed from electrical contact 22 to pin 56 of power current regulator 54. The conduction path through diode 80 is enabled or conducting while the conduction path through diode 84 is disabled or blocked. The 12 volt DC power supply from electrical contact 22 is applied to resistor 82 which causes a programming current to flow into pin 58 of current regulator 54. The diodes 80, 84 and resistor 82 represents one embodiment of a programming circuit. The value of resistor 82 is selected to create the desired programming current from the 12 volt DC power supply. If LED lamp module is designed to be a tail light, then resistor 82 is selected to have a first value. If LED lamp module is designed to be a brake light, then resistor 82 is selected to have a second value, which is less than the first value. The programming current is routed to control circuit 68, which in turn controls current source 70 to set the output current of current regulator 54. The output current of current regulator 54 determines the light intensity of LED matrix 78.

Figure 5:
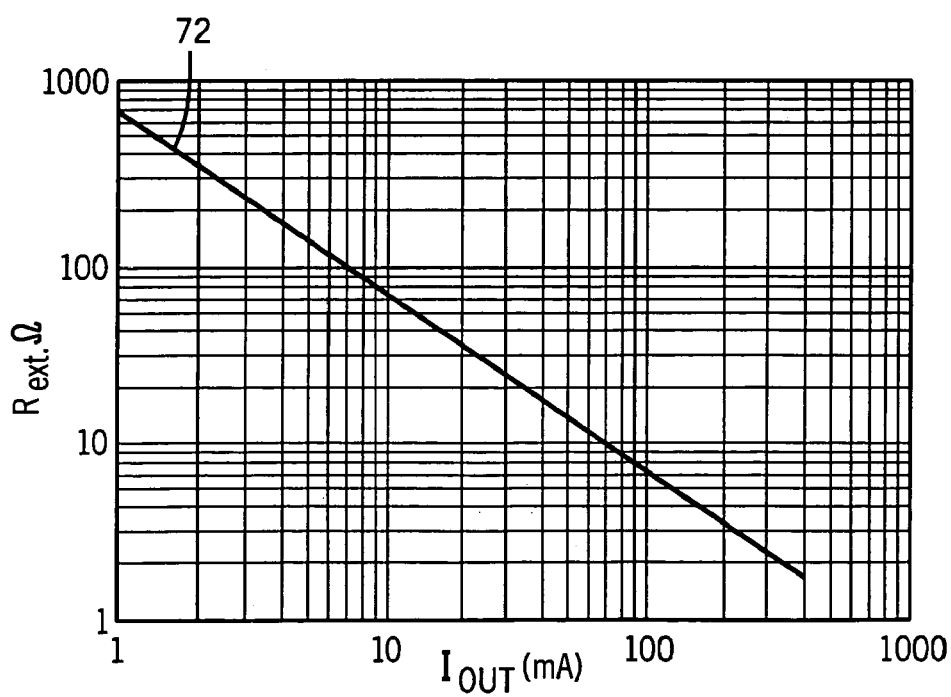
FIG. 5 is a graph of programming resistance versus output current of the current regulator.

The relationship between programming resistance (current) and output current is shown graphically as plot 72 in FIG. 5. Current regulator 54 has a number of advantages over the prior art power resistors. Current regulator 54 is a precision electronic current source which provides a precise control over its output current. The output current of current regulator 54 is selected by choosing a corresponding programming resistance or current according to plot 72 of FIG. 5. The programming current is selected by the values of resistor 82. The conduction path through resistor 82 conducts very little current. As such, resistor 82 may be made a low power, precision device. Precision low power resistors are more cost effective than precision power resistors. Resistor 82 may have a resistance tolerance of less than 1%. The precision low power resistor 82 can accurately and consistently control the output current of current regulator 54. Since resistor 82 is a low power device, the power dissipation associated with the LED current control feature for LED lamp module 20 is much less than using power resistors for the current control function to the LED matrix. Moreover, current regulator 54 is less sensitive to variation in the DC power supply, while providing a consistent and precision current to LED matrix 78 over temperature.

In another embodiment, resistor 82 may be custom trimmed or programmed during the manufacturing process to achieve even higher precision. The precision value of resistor 82 generates a highly accurate programming current to current regulator 54 and correspondingly precise output current to drive LED matrix 78. With precision resistor 82 the intensity of LED lamp module 20 is consistent across manufacturing lots and variations in supply voltage and temperature.

In the opposite orientation, when LED lamp module 20 is inserted in its socket, electrical contact 24 connects to a controlled 12 volt DC power supply and electrical contact 22 connects to the vehicle ground terminal. When the operator turns on the tail light switch or depresses the brake pedal, the 12 volt DC power supply to electrical contact 24 is energized. The potential on electrical contact 24 is positive with respect to the potential on conductor 42. Diode 46 is forward biased and diode 50 is reversed biased. The potential on conductor 48 is positive with respect to the potential on electrical contact 22. Diode 44 is forward biased and diode 40 is reversed biased. The conduction path through diodes 44 and 46 is enabled or conducting while the conduction path through diodes 40 and 50 is disabled or blocked. The 12 volt DC power supply is routed from electrical contact 24 to pin 56 of power current regulator 54. The reverse polarity circuit formed of diodes 40, 44, 46, and 50 converts or routes opposite polarities on the electrical contact 22 and 24 to a fixed positive power supply potential for current regulator 54.

The conduction path through diode 84 is enabled or conducting while the conduction path through diode 80 is disabled or blocked. The 12 volt DC power supply from electrical contact 24 is applied to resistor 82 which causes a programming current to flow into pin 58 of current regulator 54. Resistor 82 is selected to create the desired programming current from the 12 volt DC power supply. The programming current is routed to control circuit 68, which in turn controls current source 70 to set the output current of current regulator 54. The output current of current regulator 54 determines the light intensity of LED matrix 78.

Figure 6:
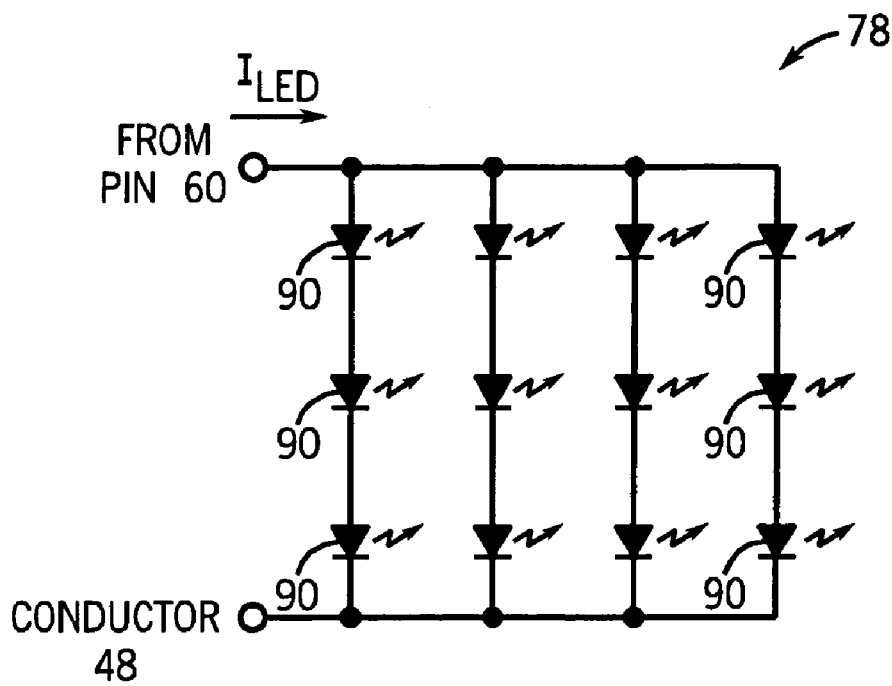
FIG. 6 illustrates further detail of the LED matrix.
Figure 7:
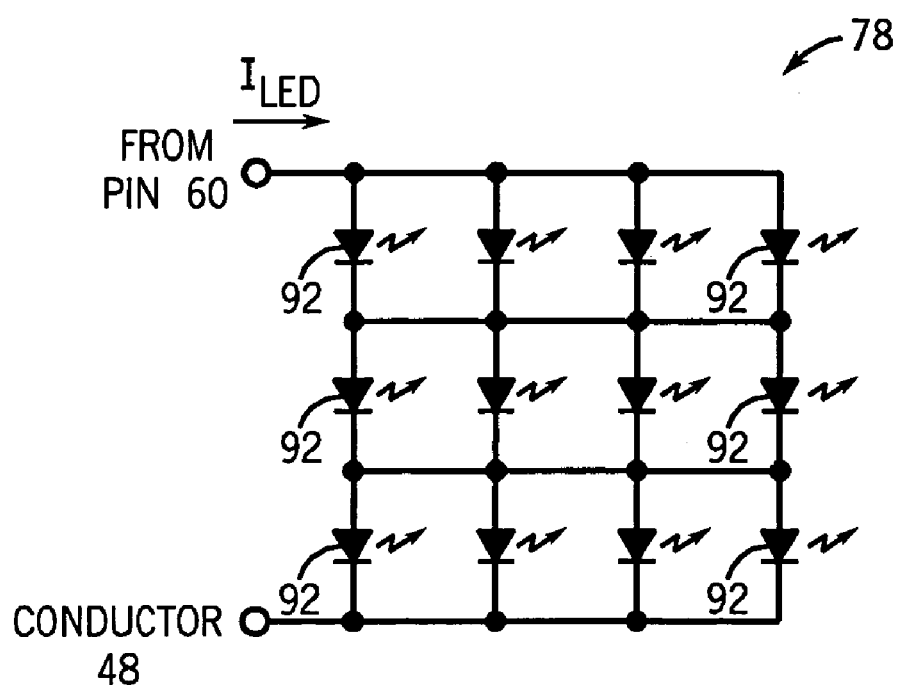
FIG. 7 illustrates an alternate embodiment of the LED matrix.

In FIG. 6, LED matrix 78 is shown having a plurality of LEDs 90. The LED matrix includes multiple columns of LEDs 90. There are multiple LEDs 90 serially connected in each column. An alternate embodiment of LED matrix 78 is shown in FIG. 7. The LED matrix includes multiple columns of LEDs 92, with multiple LEDs 92 in each column. The cathodes of LEDs 92 in one row are connected to the anodes of LEDs 92 in the following row. If one or more LEDs 92 in one row burns out or malfunctions, then the LEDs in the same column of the following row are energized by the remaining functional LEDs from the above row.

Figure 8:
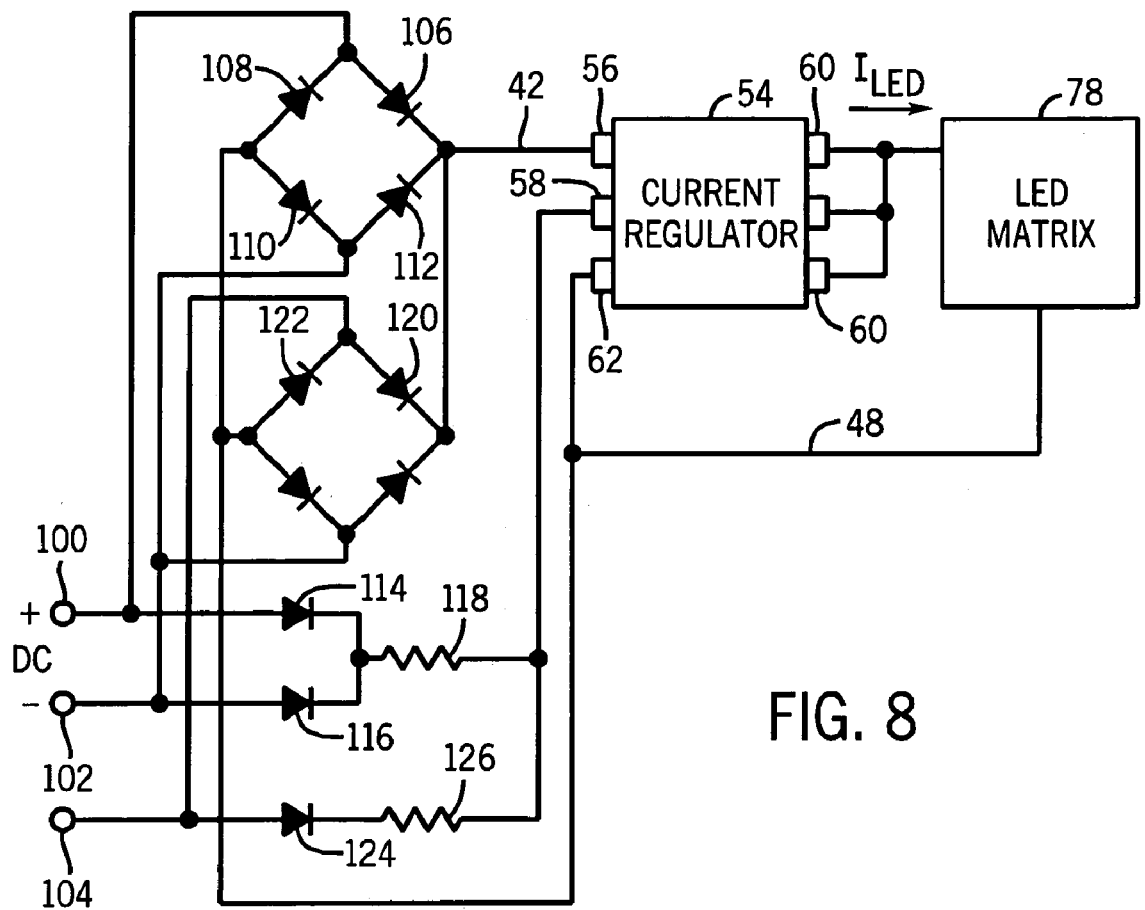
FIG. 8 is a block diagram of the LED lamp module having three electrical contacts providing dual intensity of the LED matrix.

FIG. 8 shows the LED lamp module with three electrical contacts 100, 102, and 104 for dim, bright, and ground terminal functions. Circuit components having a similar function are assigned the same reference number used in the prior figures. Again the electrical contacts are reversible allowing the LED lamp module to be inserted into the socket of the motor vehicle in alternate physical orientations. A DC voltage is applied between electrical contacts 100 and 102. In one orientation, the 12 volt DC power supply for the dim function is connected to electrical contact 100. The ground terminal is connected to electrical contact 102. The 12 volt DC power supply for the bright function is connected to electrical contact 104.

When the tail light is activated, electrical contact 100 is positive with respect to conductor 42. Diode 106 is forward biased and diode 108 is reverse biased. With the ground connection on electrical contact 102, diode 110 is forward biased and diode 112 is reverse biased. Diode 114 is forward biased and diode 116 is reverse biased. The 12 volt DC power supply for the tail light is routed through diode 106 to pin 56 of current regulator 54 to power the IC. The 12 volt DC power supply for the tail light is also routed through diode 114 to resistor 118 to generate the programming current into pin 58 of current regulator 54. Current regulator 54 is programmed according to plot 72 in FIG. 5. Current regulator 54 provides current $I_{LED}$ to illuminate LED matrix 78.

When the bright switch is activated, electrical contact 104 is positive with respect to conductor 42. Diode 120 is forward biased and diode 122 is reverse biased. Diode 124 is forward biased. The 12 volt DC power supply for the bright function is routed through diode 120 to pin 56 of current regulator 54 to power the IC. The 12 volt DC power supply for the bright function is also routed through diode 124 to resistor 126 to generate the programming current into pin 58 of current regulator 54. Current regulator 54 is programmed according to plot 72 in FIG. 5. Current regulator 54 provides current $I_{LED}$ to illuminate LED matrix 78, in the brighter mode.

In the other physical orientation, the 12 volt DC power supply for the dim mode function is connected to electrical contact 102. The ground terminal is connected to electrical contact 100. The 12 volt DC power supply for the bright mode function is connected to electrical contact 104. When the dim mode switch is activated, electrical contact 102 is positive with respect to conductor 42. Diode 112 is forward biased and diode 110 is reverse biased. With the ground connection on electrical contact 100, diode 108 is forward biased and diode 106 is reverse biased. Diode 116 is forward biased and diode 114 is reverse biased. The 12 volt DC power supply for the dim mode function is routed through diode 112 to pin 56 of current regulator 54 to power the IC. The 12 volt DC power supply for the dim function is also routed through diode 116 to resistor 118 to generate the programming current into pin 58 of current regulator 54. Current regulator 54 is programmed according to plot 72 in FIG. 5. Current regulator 54 provides current $I_{LED}$ to illuminate LED matrix 78 in the dim mode.

Figure 9:
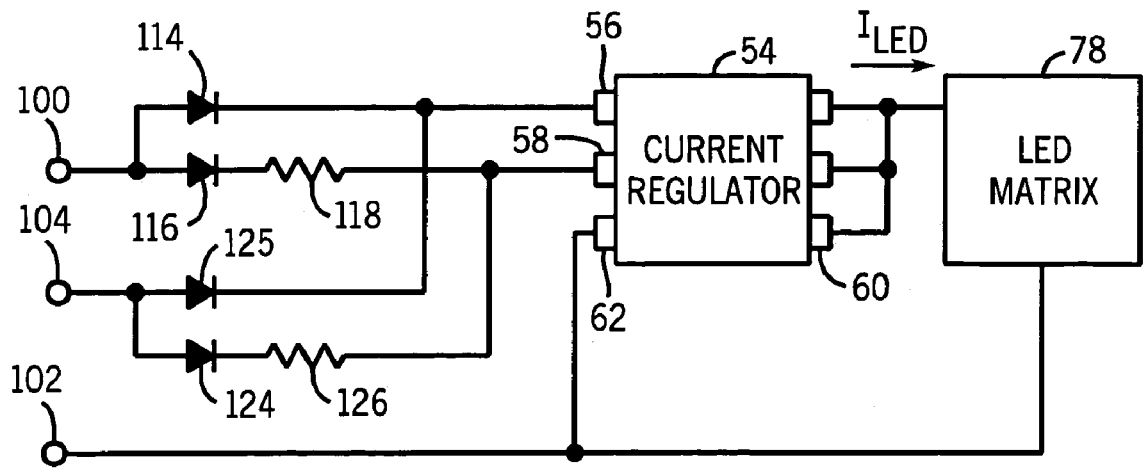
FIG. 9 is another block diagram of the LED lamp module having three electrical contacts providing dual intensity of the LED matrix.

FIG. 9 shows the LED lamp module with three electrical contacts 100, 102, and 104 for dim, bright, and ground terminal functions. Circuit components having a similar function are assigned the same reference number used in the prior figures. The embodiment shown in FIG. 9 does not use the reverse polarity circuit 106-112, 120-122. Instead, the DC voltage for current regulator 54 is received through diode 114 or through diode 125, depending upon whether dim or bright is activated. Otherwise, the LED lamp module operates as described above for FIG. 8.

Figure 10:
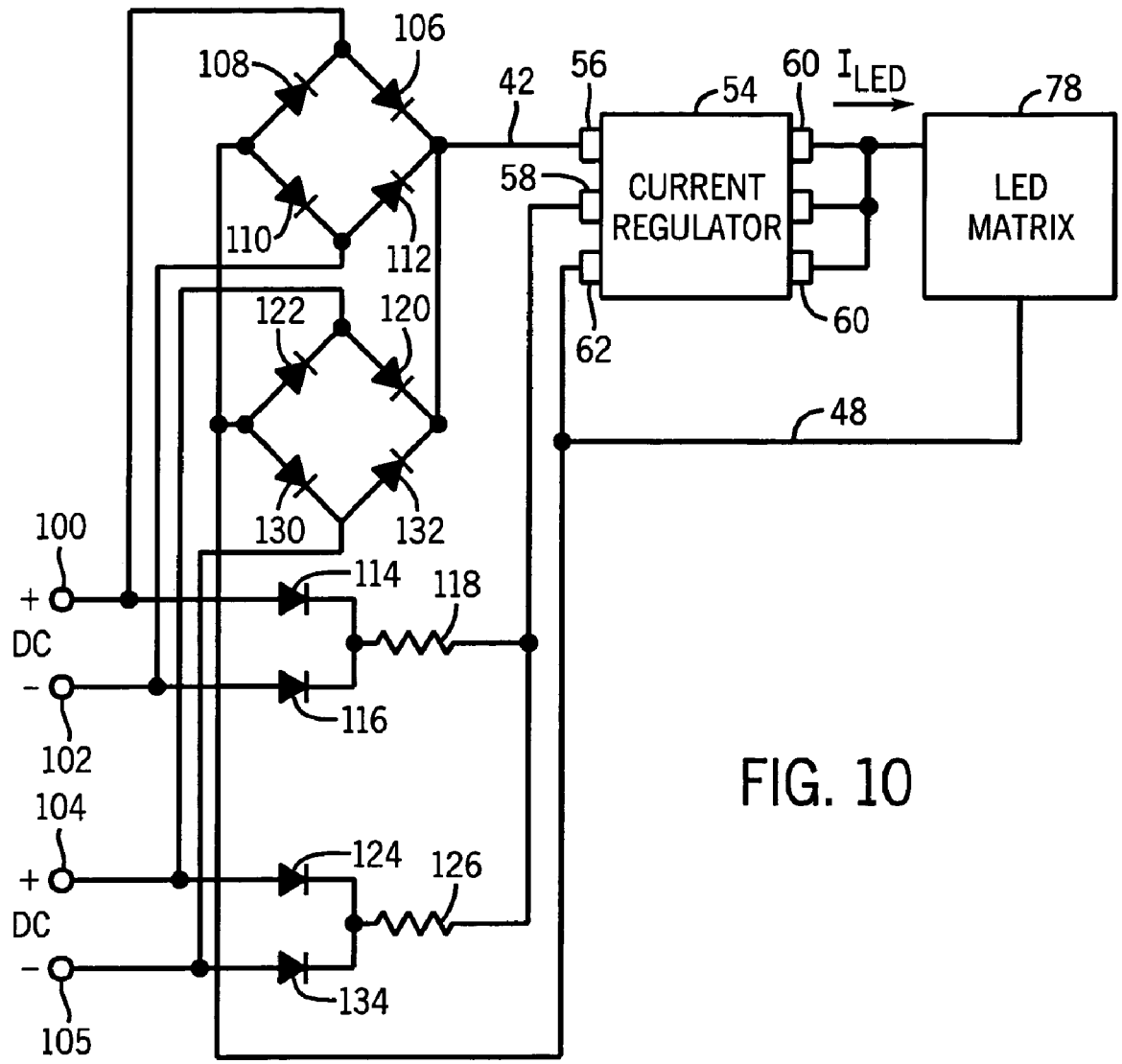
FIG. 10 is a block diagram of the LED lamp module having four electrical contacts providing dual intensity of the LED matrix.

FIG. 10 shows the LED lamp module with four electrical contacts 100, 102, 104, and 105 for dim, bright, and ground terminal functions. Circuit components having a similar function are assigned the same reference number used in the prior figures. Again the electrical contacts are reversible allowing the LED lamp module to be inserted into the mating socket in alternate physical orientations. A first DC voltage is applied between electrical contacts 100 and 102. A second DC voltage is applied between electrical contacts 104 and 105. In one orientation, the 12 volt DC power supply for the dim circuit function is connected to electrical contact 100. The 12 volt DC power supply for the bright mode function is connected to electrical contact 104. The ground terminal is connected to electrical contacts 102 and 105. When the bright mode is switched on, electrical contact 100 is positive with respect to conductor 42. Diode 106 is forward biased and diode 108 is reverse biased. With the ground connection on electrical contact 102, diode 110 is forward biased and diode 112 is reverse biased. Diode 114 is forward biased and diode 116 is reverse biased. The 12 volt DC power supply for the dim mode function is routed through diode 106 to pin 56 of current regulator 54 to power the IC. The 12 volt DC power supply for the dim mode function is also routed through diode 114 to resistor 118 to generate the programming current into pin 58 of current regulator 54. Current regulator 54 is programmed according to plot 72 in FIG. 5. Current regulator 54 provides current $I_{LED}$ to illuminate LED matrix 78 in the dim mode.

When the bright mode is switched on, electrical contact 104 is positive with respect to conductor 42. Diode 120 is forward biased and diode 122 is reverse biased. With the ground connection on electrical contact 102, diode 130 is forward biased and diode 132 is reverse biased. Diode 124 is forward biased and diode 134 is reverse biased. The 12 volt DC power supply for the bright mode function is routed through diode 120 to pin 56 of current regulator 54 to power the IC. The 12 volt DC power supply for the bright mode is also routed through diode 124 to resistor 126 to generate the programming current into pin 58 of current regulator 54. Current regulator 54 is programmed according to plot 72 in FIG. 5. Current regulator 54 provides current $I_{LED}$ to illuminate LED matrix 78 for the bright mode, which is brighter than the dim mode.

In the other physical orientation, the 12 volt DC power supply for the dim mode function is connected to electrical contact 102. The 12 volt DC power supply for the bright mode light function is connected to electrical contact 105. The ground terminal is connected to electrical contacts 100 and 104. When the bright mode is switched on, electrical contact 102 is positive with respect to conductor 42. Diode 112 is forward biased and diode 110 is reverse biased. With the ground connection on electrical contact 100, diode 108 is forward biased and diode 106 is reverse biased. Diode 116 is forward biased and diode 114 is reverse biased. The 12 volt DC power supply for the dim mode function is routed through diode 112 to pin 56 of current regulator 54 to power the IC. The 12 volt DC power supply for the tail light is also routed through diode 116 to resistor 118 to generate the programming current into pin 58 of current regulator 54. Current regulator 54 is programmed according to plot 72 in FIG. 5. Current regulator 54 provides current $I_{LED}$ to illuminate LED matrix 78 for the dim mode.

When the bright mode is switched on, electrical contact 105 is positive with respect to conductor 42. Diode 132 is forward biased and diode 130 is reverse biased. With the ground connection on electrical contact 104, diode 122 is forward biased and diode 120 is reverse biased. Diode 134 is forward biased and diode 124 is reverse biased. The 12 volt DC power supply for the bright mode function is routed through diode 132 to pin 56 of current regulator 54 to power the IC. The 12 volt DC power supply for the bright mode is also routed through diode 134 to resistor 126 to generate the programming current into pin 58 of current regulator 54. Current regulator 54 is programmed according to plot 72 in FIG. 5. Current regulator 54 provides current $I_{LED}$ to illuminate LED matrix 78 in the bright mode, which is brighter than the dim mode.

Figure 11:
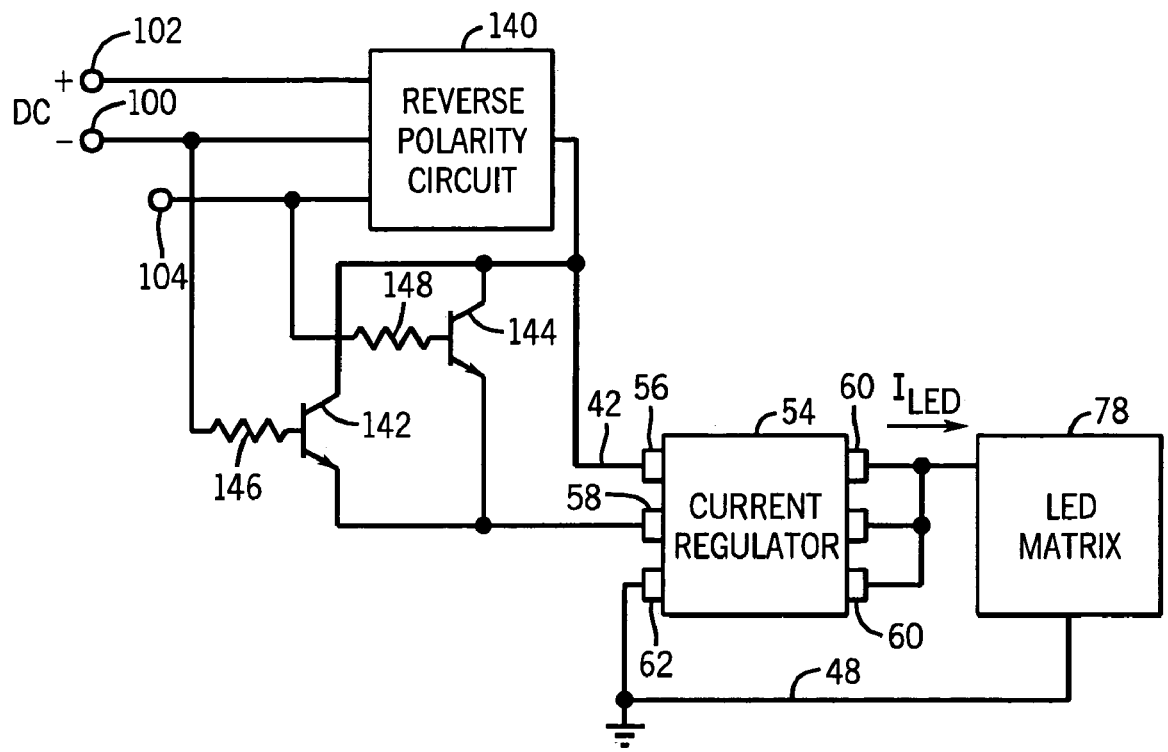
FIG. 11 illustrates the LED lamp module with the programming current source implemented as transistors.

In FIG. 11, reverse polarity circuit 140 represents diodes 106, 108, 110, and 112 and diodes 120, 122, 130, and 132. Other components having a similar function are assigned the same reference numbers used in the prior figures. In this case, current source bipolar transistors 142 and 144 generate the programming current to pin 58 of current regulator 54. Bipolar transistor 142 has a collector coupled to conductor 42 and an emitter coupled to pin 58. The electrical contact 100 is coupled through resistor 146 to the base of transistor 142. Bipolar transistor 144 has a collector coupled to conductor 42 and an emitter coupled to pin 58. The electrical contact 102 is coupled through resistor 148 to the base of transistor 144.

When the dim mode function is activated, electrical contact 100 is energized with the 12 volt DC power supply associated with the dim mode. A base current flows through resistor 146 and causes a collector-emitter current to flow through transistor 142 as a function of the base current. Accordingly, current source transistor 142 generates the programming current into pin 58 of current regulator 54. Current regulator 54 is programmed according to plot 72 in FIG. 5. Current regulator 54 provides current $I_{LED}$ to illuminate LED matrix 78 for the dim mode.

When the bright mode function is activated, electrical contact 104 is energized with the 12 volt DC power supply associated with the bright mode. A base current flows through resistor 148 and causes a collector-emitter current to flow through transistor 144 as a function of the base current. Accordingly, current source transistor 144 generates the programming current into pin 58 of current regulator 54. Current regulator 54 is programmed according to plot 72 in FIG. 5. Current regulator 54 provides current $I_{LED}$ to illuminate LED matrix 78 for the bright mode, which is brighter than the dim mode.

Figure 12:
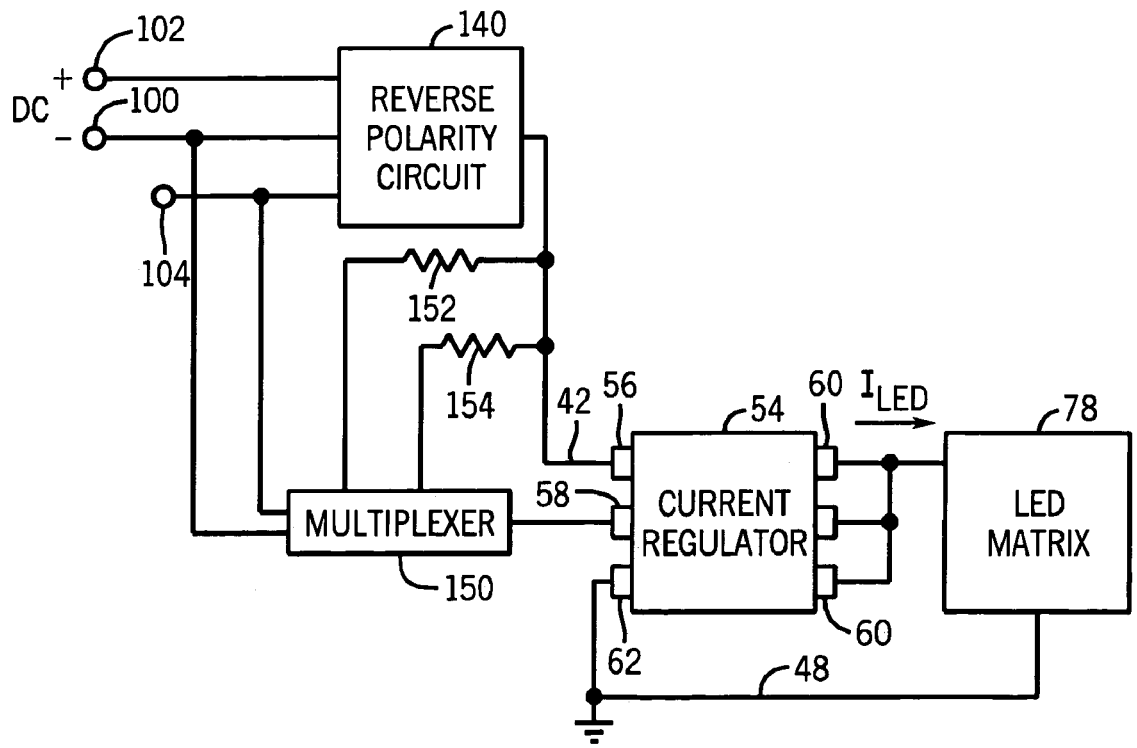
FIG. 12 illustrates the LED lamp module with a multiplexer supplying the programming current sources.

In FIG. 12, components having a similar function are assigned the same reference numbers used in the prior figures. In this case, multiplexer 150 is used to routed the programming current to pin 58 of current regulator 54. Electrical contact 100 is coupled to a first control input of multiplexer 150. Electrical contact 104 is coupled to a second control input of multiplexer 150. Resistor 152 is coupled between conductor 42 and a first conduction channel of multiplexer 150. Resistor 154 is coupled between conductor 42 and a second conduction channel of multiplexer 150.

When the dim mode function is activated, electrical contact 100 is energized with the 12 volt DC power supply associated with the dim mode. The first control input of multiplexer 150 enables the first conduction channel to connect resistor 152 to pin 58. Resistor 152 provides the programming current through the first conduction path of multiplexer 150 into pin 58 of current regulator 54. Current regulator 54 is programmed according to plot 72 in FIG. 5. Current regulator 54 provides current $I_{LED}$ to illuminate LED matrix 78 for the dim mode.

When the bright mode function is activated, electrical contact 104 is energized with the 12 volt DC power supply associated with the bright mode. The second control input of multiplexer 150 enables the second conduction channel to connect resistor 154 to pin 58. Resistor 154 provides the programming current through the second conduction path of multiplexer 150 into pin 58 of current regulator 54. Current regulator 54 is programmed according to plot 72 in FIG. 5. Current regulator 54 provides current $I_{LED}$ to illuminate LED matrix 78 for the bright mode, which is brighter than the dim mode.

Figure 13:
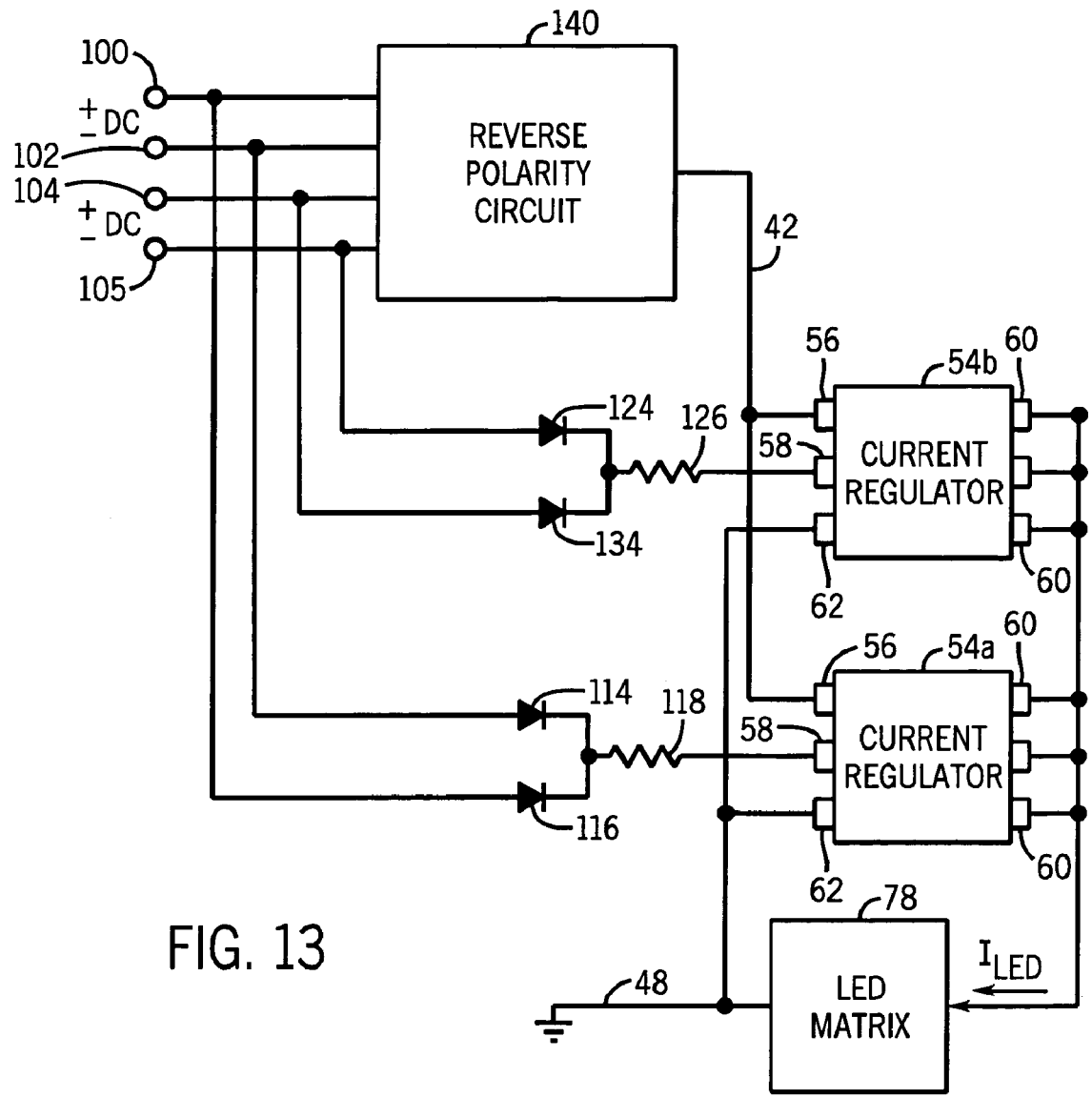
FIG. 13 illustrates the LED lamp module with dual current regulators.

Another embodiment of the LED lamp module is shown in FIG. 13. Components having a similar function are assigned the same reference numbers used in the prior figures. The programming resistor 118 is connected to pin 58 of current regulator 54a. The programming resistor 126 is connected to pin 58 of current regulator 54b. When the dim mode function is activated, resistor 118 generates the programming current for current regulator 54a. When the brake light function is activated, resistor 126 generates the programming current for current regulator 54b. Current regulators 54a and 54b are programmed according to plot 72 in FIG. 5. Current regulators 54a and 54b provide current $I_{LED}$ to illuminate LED matrix 78 for the dim mode or bright mode.

Figure 14:
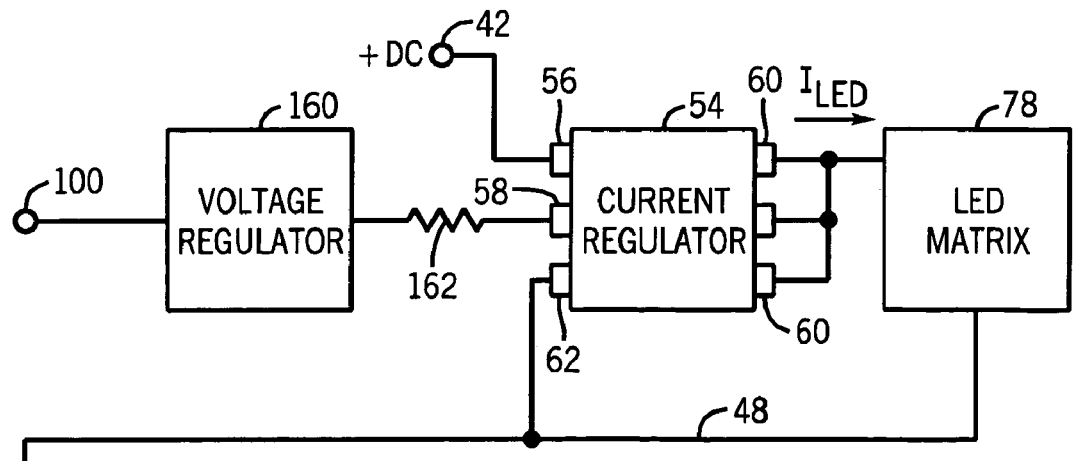
FIG. 14 illustrates the LED lamp module with voltage regulator.

FIG. 14 illustrates the LED lamp module with voltage regulator 160. Components having a similar function are assigned the same reference numbers used in the prior figures. The voltage regulator establishes a fixed voltage independent of the 12 volt DC power supply variation in the motor vehicle to generate a more accurate programming current through resistor 162 to pin 58 of current regulator 54.

Current regulator 54 is programmed according to plot 72 in FIG. 5. Current regulator 54 provides current $I_{LED}$ to illuminate LED matrix 78.

While one or more embodiments of the present invention have been illustrated in detail, the skilled artisan will appreciate that modifications and adaptations to those embodiments may be made without departing from the scope of the present invention as set forth in the following claims.

What is claimed is:

1. A light emitting diode (LED) lamp module, comprising:
   a reverse polarity circuit having inputs coupled to first and second electrical contacts for receiving an input voltage and an output providing a power supply voltage having a polarity, the reverse polarity circuit accepting either a first polarity of the input voltage or a second polarity of the input voltage opposite to the first polarity and still providing the same polarity of the power supply voltage;
   an electronic current regulator coupled for receiving the power supply voltage from the reverse polarity circuit and generating a selectable current regulated under load in response to a programming signal applied to a programming input of the electronic current regulator, the electronic current regulator including,
      (a) a control circuit having an input coupled for receiving the programming signal, and
      (b) a controllable current source having a control input coupled to an output of the control circuit and having an output for providing the selectable current regulated under load;
   an LED matrix having an input coupled for receiving the selectable current from the electronic current regulator; and
   a programming circuit providing the programming signal to the programming input of the electronic current regulator, the programming circuit including a first diode and resistor serially coupled between the first electrical contact and the programming input of the electronic current regulator.

2. The LED lamp module of claim 1, wherein the programming circuit further includes a second diode having a first terminal coupled to the second electrical contact and a second terminal coupled to an interconnection between the first diode and the resistor.

3. The LED lamp module of claim 1, wherein the LED matrix includes a plurality of serially coupled columns of LEDS which emit a light intensity in response to the selectable current from the electronic current regulator.

4. The LED lamp module of claim 3, wherein a row of LEDs in the LED matrix is coupled to the LEDs in an adjacent row of LEDs.

5. The LED lamp module of claim 1, further including a voltage regulator having an input coupled to the first electrical contact and an output coupled to the programming circuit.

6. A lamp module, comprising:
   a base having first and second electrical contacts adapted for inserting into a socket in alternate orientations;
   a printed circuit board mounted to the base, the printed circuit board including,
      (a) a reverse polarity circuit coupled to the first and second electrical contacts for converting an input voltage applied across the first and second electrical contacts to a power supply voltage, the reverse polarity circuit including a full-wave rectifier bridge having first and second inputs coupled to the first and second electrical contacts and an output for providing the power supply voltage,
      (b) a current regulator having a first terminal coupled for receiving the power supply voltage from the reverse polarity circuit and generating a selectable current regulated under load in response to a programming signal applied to a second terminal of the current regulator, and
      (c) a programming circuit providing the programming signal to the second terminal of the current regulator; and
   an LED matrix mounted to the base and having an input coupled for receiving the selectable current from the current regulator.

7. The lamp module of claim 6, wherein the programming circuit includes a first diode and resistor serially coupled between the first electrical contact and the second terminal of the current regulator.

8. The lamp module of claim 7, wherein the programming circuit further includes a second diode having a first terminal coupled to the second electrical contact and a second terminal coupled to an interconnection between the first diode and the resistor.

9. The lamp module of claim 6, wherein the programming circuit includes a transistor having a control terminal coupled to a bias source and a conduction path coupled between a power source and the second terminal of the current regulator.

10. The lamp module of claim 6, wherein the LED matrix includes a plurality of interconnected LEDs which emit a light intensity in response to the selectable current from the current regulator.

11. A light emitting diode (LED) lamp module having first and second electrical contacts, comprising:
    a current regulator having a first terminal coupled for receiving a power supply voltage and generating a selectable current regulated under load in response to a programming signal applied to a second terminal of the current regulator;
    a programming circuit providing the programming signal to the second terminal of the current regulator to generate the selectable current regulated under load;
    an LED matrix having an input coupled for receiving the selectable current from the current regulator; and
    a reverse polarity circuit having inputs coupled to the first and second electrical contacts for receiving an input voltage and an output providing the power supply voltage, the reverse polarity circuit accepting either a first polarity of the input voltage or a second polarity of the input voltage opposite to the first polarity and still providing the same polarity of the power supply voltage.

12. The LED lamp module of claim 11, wherein the programming circuit includes a first diode and resistor serially coupled between the first electrical contact and the second terminal of the current regulator.

13. The LED lamp module of claim 12, wherein the programming circuit further includes a second diode having a first terminal coupled to the second electrical contact and a second terminal coupled to an interconnection between the first diode and the resistor.

14. The LED lamp module of claim 11, wherein the LED matrix includes a plurality of interconnected LEDs which emit a light intensity in response to the selectable current from the current regulator.

15. The LED lamp module of claim 11, wherein the programming circuit includes a transistor having a control terminal coupled to a bias source and a conduction path coupled between a power source and the programming input of the current regulator.

16. The LED lamp module of claim 11, wherein the programming circuit includes a multiplexer having first and second inputs coupled for receiving first and second currents and an output connected to the programming input of the current regulator.

17. A light emitting diode (LED) lamp module, comprising:
   a reverse polarity circuit having inputs coupled to first and second electrical contacts for receiving an input voltage and an output providing a power supply voltage having a polarity, the reverse polarity circuit accepting either a first polarity of the input voltage or a second polarity of the input voltage opposite to the first polarity and still providing the same polarity of the power supply voltage;
   an electronic current regulator coupled for receiving the power supply voltage from the reverse polarity circuit and generating a selectable current regulated under load in response to a programming signal applied to a programming input of the electronic current regulator;
   an LED matrix having an input coupled for receiving the selectable current from the electronic current regulator; and
   a programming circuit providing the programming signal to the programming input of the electronic current regulator.

18. The LED lamp module of claim 17, wherein the programming circuit further includes a second diode having a first terminal coupled to the second electrical contact and a second terminal coupled to an interconnection between the first diode and the resistor.

19. The LED lamp module of claim 17, wherein the LED matrix includes a plurality of serially coupled columns of LEDs which emit a light intensity in response to the selectable current from the electronic current regulator.

20. The LED lamp module of claim 19, wherein a row of LEDs in the LED matrix is coupled to the LEDs in an adjacent row of LEDS.

21. The LED lamp module of claim 17, further including a voltage regulator having an input coupled to the first electrical contact and an output coupled to the programming circuit.

22. The LED lamp module of claim 17, further including a first diode and resistor serially coupled between the first electrical contact and the programming input of the electronic current regulator.

23. The LED lamp module of claim 17, wherein the programming circuit includes a transistor having a control terminal coupled to a bias source and a conduction path coupled between a power source and the programming input of the current regulator.

* * * * *